US011268835B2

(12) United States Patent
Loeken

(10) Patent No.: US 11,268,835 B2
(45) Date of Patent: Mar. 8, 2022

(54) SENSOR UNIT FOR A ROTATIONAL ANGLE MEASUREMENT SYSTEM AND ROTATIONAL ANGLE MEASUREMENT SYSTEM HAVING SUCH A SENSOR UNIT

(71) Applicant: FRABA B.V., SG Heerlen (NL)

(72) Inventor: Michael Loeken, Juelich (DE)

(73) Assignee: FRABA B.V., SG Heerlen (NL)

( * ) Notice: Subject to any disclaimer, the term of this patent is extended or adjusted under 35 U.S.C. 154(b) by 98 days.

(21) Appl. No.: 16/618,111

(22) PCT Filed: May 31, 2017

(86) PCT No.: PCT/EP2017/063219
§ 371 (c)(1),
(2) Date: Nov. 28, 2019

(87) PCT Pub. No.: WO2018/219454
PCT Pub. Date: Dec. 6, 2018

(65) Prior Publication Data
US 2020/0141770 A1    May 7, 2020

(51) Int. Cl.
*G01D 11/24* (2006.01)
*G01D 5/244* (2006.01)

(52) U.S. Cl.
CPC ....... *G01D 11/245* (2013.01); *G01D 5/24423* (2013.01)

(58) Field of Classification Search
CPC .......... G01D 5/24423; G01D 11/245
See application file for complete search history.

(56) References Cited

U.S. PATENT DOCUMENTS

| 6,002,126 | A | 12/1999 | Feichtinger | |
|---|---|---|---|---|
| 10,288,450 | B2 * | 5/2019 | Forthaus | G01D 5/24433 |
| 10,605,624 | B2 * | 3/2020 | Forthaus | G01R 33/0017 |
| 2008/0272660 | A1 | 11/2008 | Becker et al. | |
| 2014/0047913 | A1 | 2/2014 | Waite et al. | |
| 2018/0010926 | A1 | 1/2018 | Forthaus | |
| 2019/0028001 | A1 * | 1/2019 | Forthaus | H02K 11/0141 |

FOREIGN PATENT DOCUMENTS

| DE | 196 45 605 A1 | 5/1998 | |
|---|---|---|---|
| DE | 10 2005 039 081 A1 | 2/2007 | |
| DE | 102005039081 A1 * | 2/2007 | ......... G01D 5/34738 |
| DE | 10 2014 118 041 A1 | 6/2016 | |
| DE | 102014118041 A1 * | 6/2016 | ........... G01D 11/245 |
| DE | 10 2015 101 248 A1 | 7/2016 | |
| JP | 5-8425 U | 2/1993 | |
| JP | 5-66134 A | 3/1993 | |
| JP | 2009-522988 A | 6/2009 | |
| JP | 2015-529325 A | 10/2015 | |

* cited by examiner

*Primary Examiner* — Jamel E Williams
(74) *Attorney, Agent, or Firm* — Norman B. Thot

(57) ABSTRACT

A sensor unit for a rotational angle measurement system for detecting a rotational movement of a drive shaft includes a housing arrangement with a pot-shaped housing part, a carrier member, a sensor printed circuit board arranged on the carrier member, and a bearing which, in an operating state, mounts the sensor printed circuit board in a stationary manner in the housing arrangement with respect to the drive shaft. The bearing is a form fit/force fit arrangement so that the carrier member is movably mounted in the housing arrangement in a pre-assembled state.

12 Claims, 3 Drawing Sheets

US 11,268,835 B2

SENSOR UNIT FOR A ROTATIONAL ANGLE MEASUREMENT SYSTEM AND ROTATIONAL ANGLE MEASUREMENT SYSTEM HAVING SUCH A SENSOR UNIT

CROSS REFERENCE TO PRIOR APPLICATIONS

This application is a U.S. National Phase application under 35 U.S.C. § 371 of International Application No. PCT/EP2017/063219, filed on May 31, 2017. The International Application was published in German on Dec. 6, 2018 as WO 2018/219454 A1 under PCT Article 21(2).

FIELD

The present invention relates to a sensor unit for a rotational angle measurement system for detecting a rotational movement of a drive shaft, having a housing arrangement which comprises at least one pot-shaped housing part in which a sensor printed circuit board arranged on a carrier member is provided so that, in the operating state, the sensor printed circuit board is mounted in the housing arrangement in a stationary manner with respect to the drive shaft via a bearing means. The present invention further relates to a rotational angle measurement system for detecting a rotational movement of a drive shaft that comprises a magnet exciter unit at a free end in a rotationally fixed manner.

BACKGROUND

Such rotational angle measurement systems serve to measure rotational movements of a shaft and are also often called an angle measurement device, a rotational angle sensor or a rotary encoder. They are in particular used to control and monitor machines and electric motors. Contact-free rotational angle measurement systems, such as optical or magnetic systems, play a special role since they have a long service life due to a wear-free sensor arrangement. In magnet-based rotational angle measurement systems, the rotation of a shaft is detected by a measurement unit which in particular comprises a rotating exciter unit, such as a permanent magnet, and a stationary sensory unit with at least one sensor, such as a Hall sensor and/or a Wiegand sensor. The Hall sensor is thereby used for the single turn rotation and the Wiegand sensor for the multiturn rotation. The measurement unit is in most cases, however, arranged at the free end of the shaft to be monitored.

A sensor unit or a rotational angle measurement system is described, for example, in DE 10 2015 101 248 A1 where the sensor unit is not finished until the final assembly of the rotational angle measurement systems, wherein the carrier member with the sensor printed circuit board is first fastened on a housing part, through which the drive shaft extends, and then a housing arrangement, in which at least the carrier member and the sensor printed circuit board are protectively received, is also provided by a fastening means. It should be clear that the smallest faults in such an assembly process of a highly sensitive sensor unit can have a negative effect on the function of the sensor unit or the rotational angle measurement system. Fastening the carrier member of the sensor printed circuit board on the housing part, through which the drive shaft extends, has in particular proven to be very prone to faults. The assembly process can also be made more complicated due to the small assembly space, in particular when inserting fastening screws.

SUMMARY

An aspect of the present invention is to provide a sensor unit or a rotational angle measurement system which avoids the aforementioned disadvantage.

In an embodiment, the present invention provides a sensor unit for a rotational angle measurement system for detecting a rotational movement of a drive shaft which includes a housing arrangement which comprises at least one pot-shaped housing part, a carrier member, a sensor printed circuit board arranged on the carrier member, and a bearing means which, in an operating state, mounts the sensor printed circuit board in a stationary manner in the housing arrangement with respect to the drive shaft. The bearing means is configured as a form fit/force fit arrangement so that the carrier member is movably mounted in the housing arrangement in a pre-assembled state.

BRIEF DESCRIPTION OF THE DRAWINGS

The present invention is described in greater detail below on the basis of embodiments and of the drawings in which.

DETAILED DESCRIPTION

Figure 1:
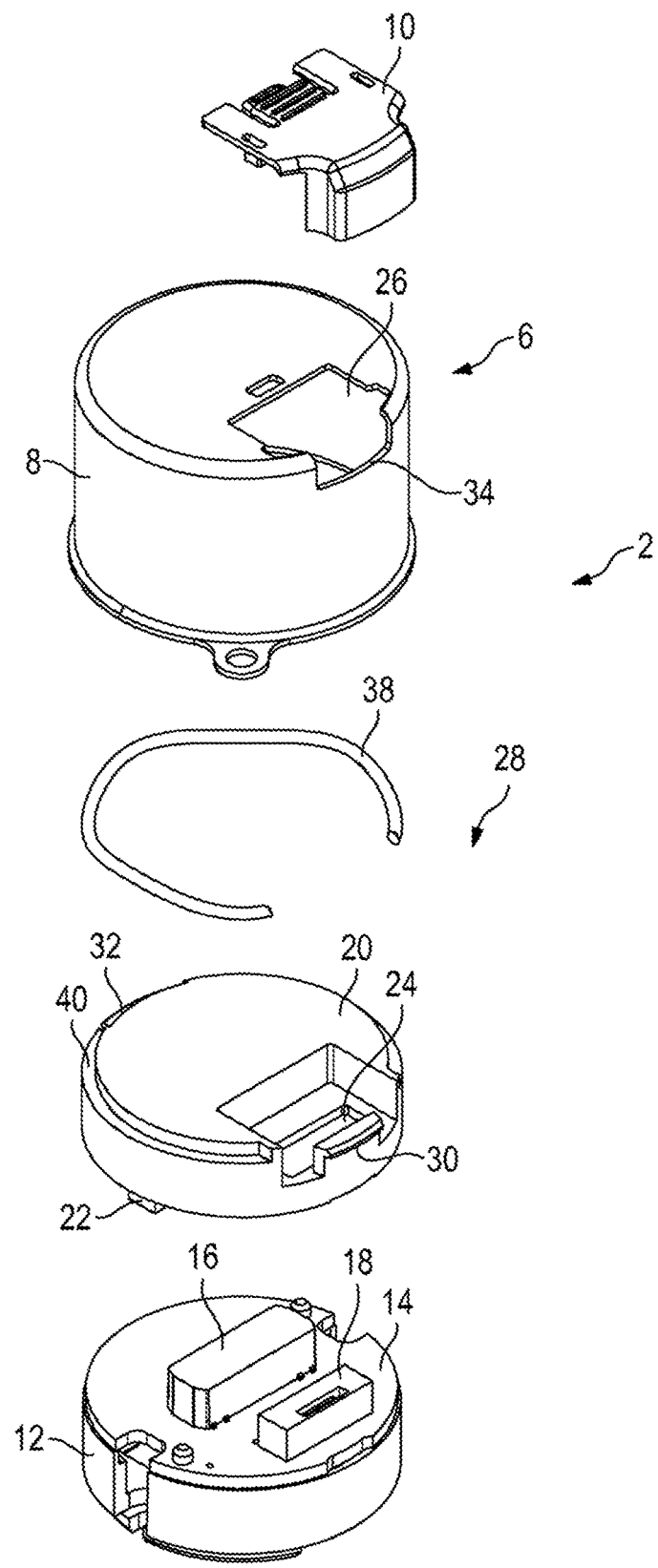
FIG. 1 shows a schematic exploded view of a sensor unit according to the present invention.

In an embodiment, the present invention provides that the bearing means for the sensor printed circuit board is designed as a form-fit/force-fit arrangement so that, in the pre-assembled state, the carrier member is mounted in the housing arrangement in a movable manner. No separate fastening of the carrier member, for example, via fastening screws, with the sensor printed circuit board is thereby required. The final assembly of the sensor unit essentially takes place merely by fastening the housing arrangement. Since the sensor printed circuit board is designed as a form-fit/force-fit arrangement, the carrier member with the sensor printed circuit board comprises at least a movability in the axial direction in the pre-assembled state, wherein the carrier member is, however, securely held in the housing arrangement by a form-fit arrangement. A force-fit of the carrier member in the housing arrangement is only established by the final assembly process, whereby, in the operating state, the sensor printed circuit board is mounted in the housing arrangement in a stationary manner with respect to the drive shaft. A further major advantage of the sensor unit according to the present invention is that the sensor unit can be completely pre-assembled, thereby providing a simple mounting and a safe transport.

A form-fit/force-fit arrangement that can be manufactured in a particularly simple and cost-effective manner comprises at least one engaging member which engages with a housing part opening, and at least one spring member. It is here particularly advantageous if the sensor printed circuit board comprises a cover member that is detachably or non-detachably connected to the carrier member and/or the sensor printed circuit board. This cover member can then serve as an attack surface for the spring member to establish the force-fit in a final assembly state. The cover member further protects the sensor printed circuit board from dirt, such as dust etc. It further provides a contact protection with regard to ESD (electrostatic discharge). The engaging members of the form-fit/force-fit arrangement are here configured in an advantageous manner. A particularly simple pre-assembly of the sensor unit is thereby provided.

The spring member is designed in an advantageous manner as a wave spring that is mounted in the cover member and engages with a bottom part of the pot-shaped housing part. The wave spring offers a high bias with low spring travel, whereby the sensor unit can be designed in a compact manner. The wave spring also allows for a uniform application of force to the cover member.

The cover member advantageously comprises a recess for a connector plug which is provided on the sensor printed circuit board, wherein the recess engages with a corresponding opening of the pot-shaped housing part. The opening can here form a housing part opening for an engaging member that at least partially limits the recess. The housing part opening is covered when the engaging member engages, whereby a safe cable routing to the connector plug is provided and damage of the cables by a sharp-edged opening of the pot-shaped housing part prevented.

The pot-shaped housing part is advantageously manufactured from a magnetically conducting material and provides a protection of the sensor printed circuit board from electrostatic discharges and outer magnetic interference fields.

It is also advantageous if the carrier member comprises a centering ledge via which the sensor printed circuit board can be aligned radially and/or axially.

The present invention also provides a rotational angle measurement system for detecting a rotational movement of a drive shaft that comprises a magnet exciter unit with the aforementioned sensor unit at a free end in a rotationally fixed manner, wherein at least one magnet of the magnet exciter unit is connected to the drive shaft and extends, in an operating state, into a cavity of the carrier member facing the sensor printed circuit board. The carrier member thereby acts a shielding body of the magnet exciter unit.

The magnet can advantageously be arranged in a magnet carrier unit made of plastic so as to provide a simple pre-positioning in the cavity.

In an embodiment of the present invention, an end plate can, for example, be provided that is connected to the carrier member and, in the case of a completely pre-assembled rotational angle measurement system, provides the application of force for a force-fit.

The present invention is described in greater detail below under reference to the drawings.

FIG. 1 shows a schematic perspective view of a sensor unit 2 according to the present invention which is used, as described in detail in the following description of FIGS. 2 and 3, in a rotational angle measurement system 4 according to the present invention. Sensor unit 2 comprises a housing arrangement 6 which, in this exemplary embodiment, substantially includes a pot-shaped housing part 8 and a protection cap 10 used during transport. A carrier member 12 is also shown on which a sensor printed circuit board 14 is glued in a common manner. Other fastening possibilities, such a pressing, screwing etc., are certainly also possible.

For overview purposes, only a sensor member 16, which can be configured as a Wiegand sensor or as a Hall sensor, and a connector plug 18, are shown on the sensor printed circuit board 14. It should be clear, however, that a plurality of further electronic components may be provided on the sensor printed circuit board 14.

In an assembled state, sensor printed circuit board 14 is covered by a cover member 20 which is connected in a common manner by engaging means 22 to carrier member 12 and/or to sensor printed circuit board 14. It is also possible, however, for cover member 20 to be clipped on a protruding edge of carrier member 12 or glued on carrier member 12 or on sensor printed circuit board 14.

Cover member 20 comprises a recess 24 which, in an assembly state of sensor unit 2, corresponds with connector plug 18 and an opening 26 so that, in the final assembly state of rotational angle measurement system 4, a plug member (which is not shown in the drawings) can engage from the outside into connector plug 18. According to the present invention, sensor unit 2 comprises a form-fit/force-fit arrangement 28 which movably mounts carrier member 12 together with sensor printed circuit board 14 in the pre-assembled state in the pot-shaped housing part 8 and which fixedly mounts carrier member 12 together with sensor printed circuit board 14 in the final assembly state of rotational angle measurement system 4 in the pot-shaped housing part 8. In the present exemplary embodiment, the form-fit/force-fit arrangement 28 comprises two engaging members 30, 32 which engage into corresponding openings 34, 36 (see FIG. 3) and form a form-fit and a spring member 38 which is designed as a wave spring 38 so that a force-fit results in the final assembly state. It can also be advantageous if the carrier member 12 comprises a centering ledge (which is not shown in the drawings) via which the sensor printed circuit board 14 can be aligned radially and/or axially.

The assembly of sensor unit 2, which is at the same time the pre-assembly of rotational angle measurement system 4, is hereinafter described. Cover member 20 is connected to carrier member 12 via engaging means 22 and thereby covers sensor printed circuit board 14. Spring member 38 can then be clipped on an edge 40 of cover member 20. Subsequently, carrier member 12 is engaged into opening 34, 36 of the pot-shaped housing part 8 via engaging members 30, 32 to provide an axial movability of carrier member 12. In this assembly situation, wave spring 38 does not establish any or only a small force-fit. Due to the fact that engaging member 30 engages into opening 34, which is part of recess 24, a cable of a plug member is protected from damage resulting from a sharp edge of the pot-shaped housing part 8. Protection cap 10 can be put on for transport purposes.

Figure 2:
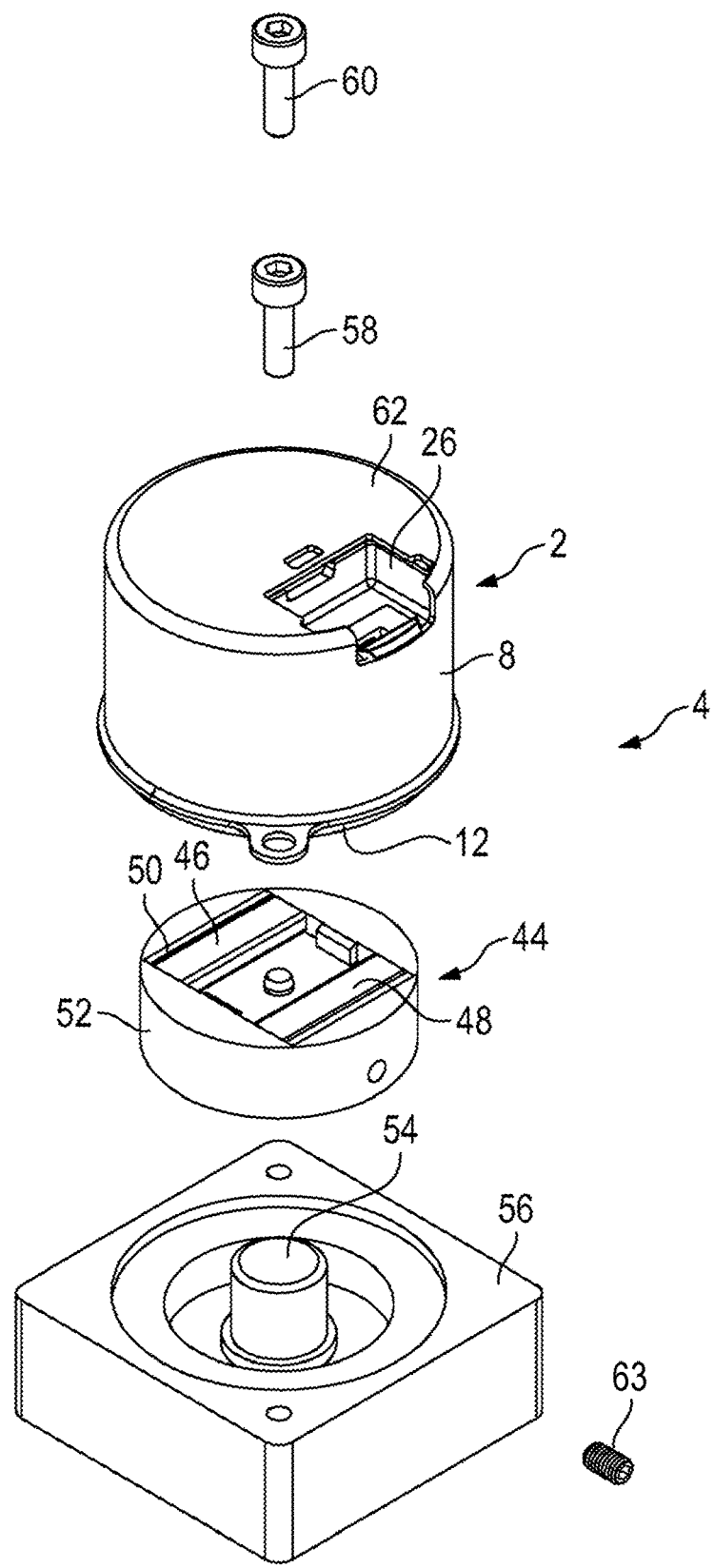
FIG. 2 shows a schematic exploded view of a rotational angle measurement system according to the present invention with the sensor unit of FIG. 1.

FIG. 2 shows the rotational angle measurement system 4 in a schematic exploded view. On the bottom side of sensor unit 2, the edge of carrier member 12 can be seen which can protrude from the pot-shaped housing part 8 due to the movable mounting. As illustrated clearly in FIG. 3, carrier member 12 comprises a cavity 42 at the side facing away from sensor printed circuit board 14 into which a magnet exciter unit 44 extends in the final assembly state. Magnet exciter unit 44 comprises two permanent magnets 46, 48 which are clipped into a magnet carrier arrangement 52 via an enclosing member 50 and are then arranged on a drive shaft 54 in a rotationally fixed manner in the final assembly state. It should be clear that other magnets, such as diametrically magnetized round magnets, can certainly also be used. Drive shaft 54 is mounted in an adapter housing 56 in the present exemplary embodiment. A magnet carrier plate can be provided as an alternative to magnet carrier arrangement 52. The final assembly of rotational angle measurement system 4 is carried out by pressing magnet carrier arrangement 52 onto drive shaft 54 and placing sensor unit 2 on adapter housing 56. The final assembly can alternatively also be carried out by screwing. Sensor unit 2 is fixed by screws 58, 60, whereby the bottom side of carrier member 12 is pressed in the direction of a bottom part 62 and is thereby aligned as the case might be and biases wave spring 38, whereby carrier member 12 is engaged and possibly firmly fixed together with sensor printed circuit board 14 via a force-fit in the pot-shaped housing part 8. A screw 63 is provided for securing a rotary coupling of magnet carrier arrangement 52 to drive shaft 54.

Figure 3:
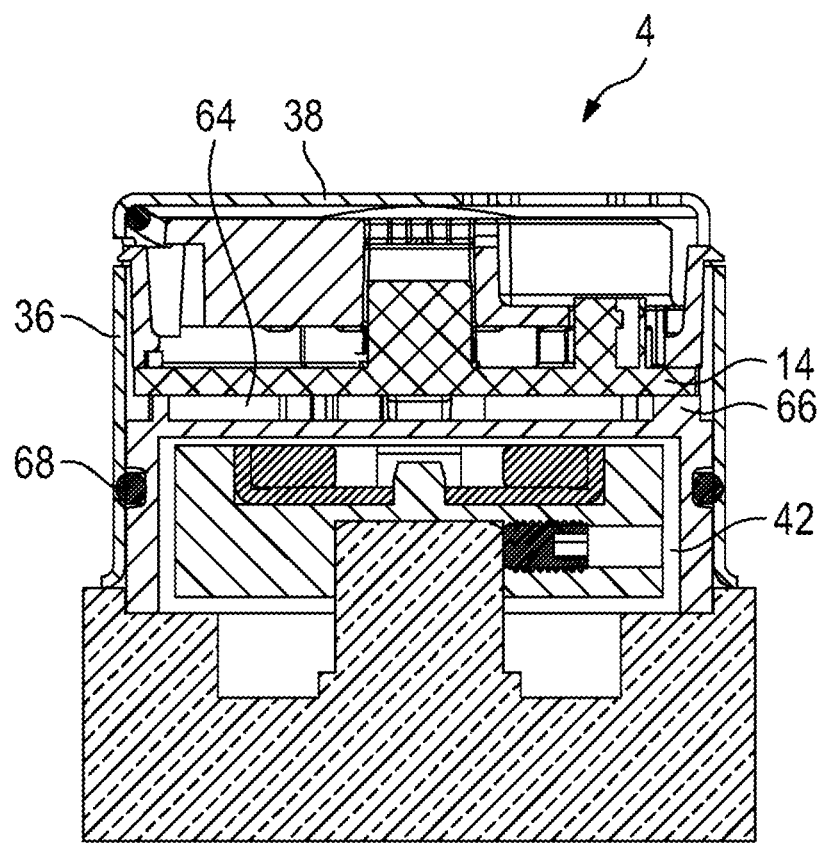
FIG. 3 shows a sectional view of the rotational angle measurement system of FIG. 2.

FIG. 3 shows a sectional view of rotational angle measurement system 4 in the final assembly state. The pressed-in wave spring 38, which provides the force-fit fixing of sensor unit 2 in the pot-shaped housing part 8, can clearly be seen. A protection of sensor printed circuit board 14 from, for example, dirt, humidity or pressure differences, is provided by sealing a space 64 via a circumferential bar 66 or an O-ring seal 68.

The present invention is not limited to embodiments described herein; reference should be had to the appended claims.

What is claimed is:

1. A sensor unit for a rotational angle measurement system for detecting a rotational movement of a drive shaft, the sensor unit comprising:
    a housing arrangement which comprises at least one pot-shaped housing part;
    a carrier member;
    a sensor printed circuit board arranged on the carrier member; and
    a bearing means which, in an operating state, mounts the sensor printed circuit board in a stationary manner in the housing arrangement with respect to the drive shaft, the bearing means being configured as a form-fit/force-fit arrangement so that the carrier member is movably mounted in the housing arrangement in a pre-assembled state,
    wherein,
    the sensor printed circuit board comprises a cover member, and
    the cover member is detachably or non detachably connected to at least one of the carrier member and the sensor printed circuit board.

2. The sensor unit as recited in claim 1, wherein,
    the at least one pot-shaped housing part of the housing arrangement comprises a housing part opening, and
    the form-fit/force-fit arrangement comprises at least one spring member and at least one engaging member which is configured to engage with the housing part opening.

3. The sensor unit as recited in claim 1, wherein the at least one engaging member of the form-fit/force-fit arrangement is provided at the cover member.

4. The sensor unit as recited in claim 1, wherein,
    the at least one pot-shaped housing part of the housing arrangement further comprises a bottom part, and
    the at least one spring member is provided as a wave spring mounted in the cover member and is configured to engage with the bottom part of the at least one pot-shaped housing part.

5. The sensor unit as recited in claim 1, wherein,
    the at least one pot-shaped housing part of the housing arrangement further comprises an opening,
    the sensor printed circuit board further comprises a connector plug,
    the cover member of the sensor printed circuit board comprises a recess for the connector plug, and
    the recess is configured to engage with the opening of the at least one pot-shaped housing part.

6. The sensor unit as recited in claim 5, wherein the opening forms a housing part opening for the at least one engaging member that at least partially limits the recess.

7. The sensor unit as recited in claim 1, wherein the at least one pot-shaped housing part is manufactured from a magnetically conducting material.

8. The sensor unit as recited in claim 1, wherein the carrier member comprises a centering ledge via which the sensor printed circuit board can be aligned at least one of radially and axially.

9. A rotational angle measurement system for detecting a rotational movement of a drive shaft, the rotational angle measurement system comprising:
    a magnet exciter unit comprising at least one magnet, the magnet exciter unit being arranged at a free end of the drive shaft in a rotationally fixed manner; and
    the sensor unit as recited in claim 1,
    wherein,
    the carrier member comprises a cavity, and
    the at least one magnet of the magnet exciter unit is connected to the drive shaft and extends, in an operating state, into the cavity of the carrier member facing the sensor printed circuit board.

10. The rotational angle measurement system as recited in claim 9, wherein,
    the magnet exciter unit further comprises a magnet carrier arrangement which is made of plastic, and
    the at least one magnet is arranged in the magnet carrier arrangement.

11. The rotational angle measurement system as recited in claim 9, further comprising:
    an end plate which is connected to the carrier member.

12. The rotational angle measurement system as recited in claim 9,
    wherein the at least one magnet is provided as a round magnet.

* * * * *